2,240,827

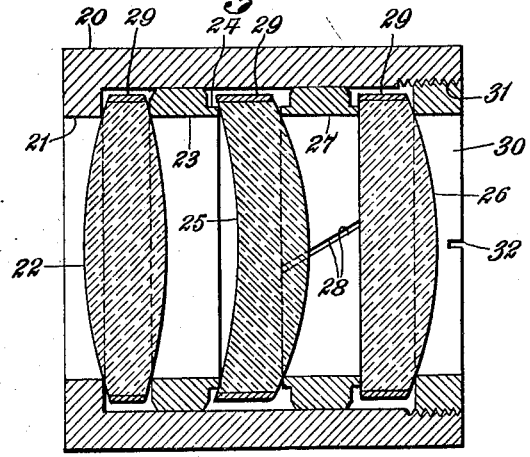
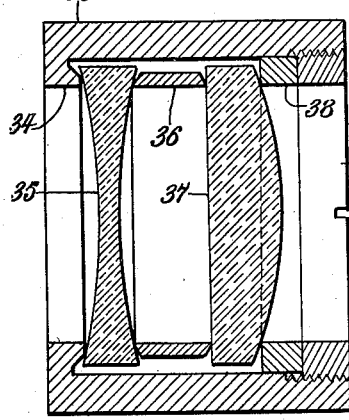
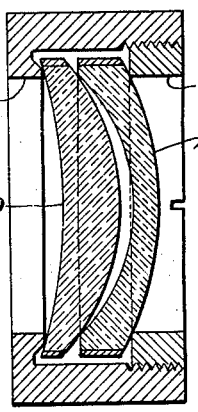
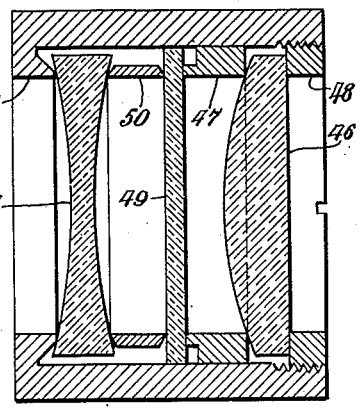
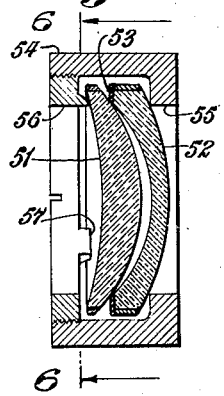
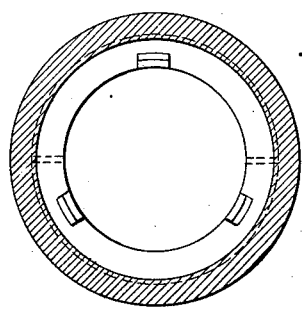
INVENTORS
Frank A. Bangert,
Ralph K. Day,
Thomas G. Aitcheson &
Lawrence J. Davenport
BY
Walter H. Popp ATTORNEY May 6, 1941.  F. A. BANGERT ET AL  2,240,827
LENS AND LENS MOUNT
Filed Sept. 9, 1938    2 Sheets-Sheet 2
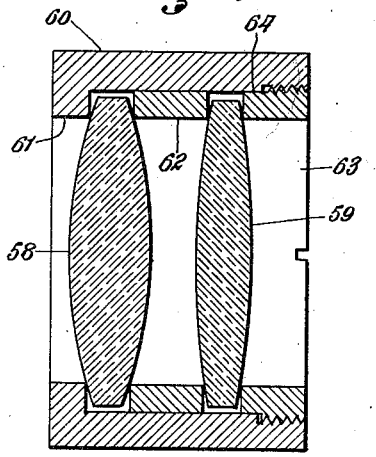
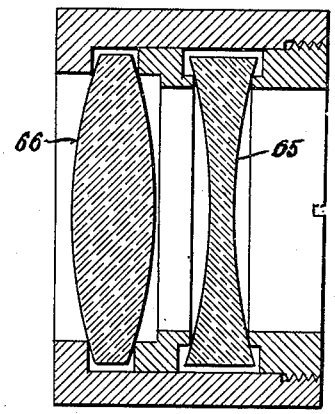
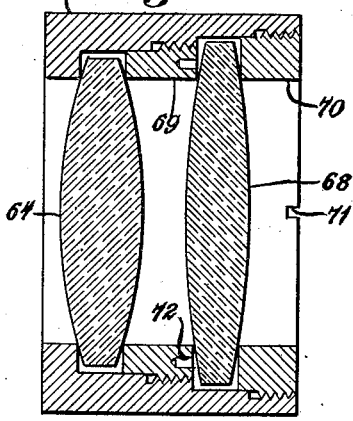
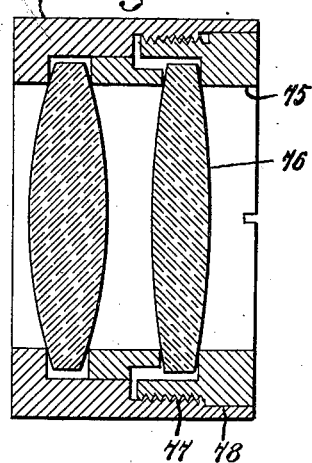
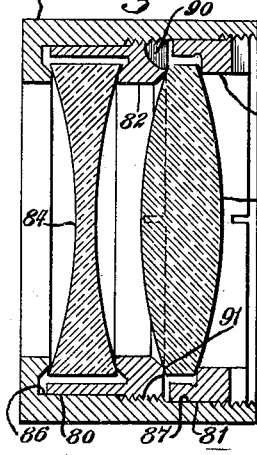
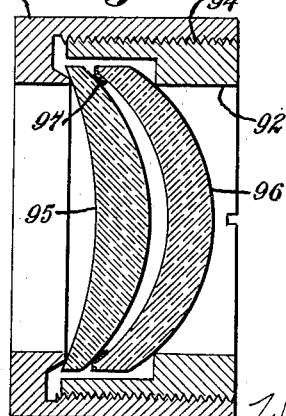
INVENTORS
Frank A. Bangert,
Ralph K. Day,
Thomas G. Aitcheson +
Lawrence J. Davenport
BY
Walter H. Popp ATTORNEY Patented May 6, 1941

UNITED STATES PATENT OFFICE 2,240,827

LENS AND LENS MOUNT

Frank A. Bangert, Buffalo, Ralph K. Day, Snyder, and Thomas G. Aitcheson, Kenmore, N. Y., and Lawrence J. Davenport, Long Beach, Calif., assignors to Spencer Lens Company, Buffalo, N. Y., a corporation of New York Application September 9, 1938, Serial No. 229,158

8 Claims. (Cl. 88—57)

This invention relates to a lens and lens mount and more particularly to a plurality of lenses mounted in a single lens mount and adapted to be used in photographic work.

The principal objects of the invention are: A, to provide a lens or lens mount in which each lens is automatically aligned axially during the assembly operation without requiring that its periphery be formed concentric with the optical axis of the lens; B, to effect this automatic centering without requiring that the mechanical parts involved be machined to close tolerances; C, to trap all light rays which travel longitudinally outside of the optical apertures of the lens and lens mount; D, to absorb such grazing and reflected rays as would otherwise be deflected into the main stream of light rays and thereby impair the clearness of the final image form; E, to provide an improved process of making the lens whereby the peripheral edge of the lens is so re-enforced that chipping of its edges during the grinding operation is prevented; F, to provide such an optical arrangement as will permit a pair of lenses to be placed in firm contact with each other and still be free to move laterally relatively to each other; G, to provide a mechanical means of centering a lens with reference to one mechanical surface only; and H, to provide a means for mechanically centering a lens without subjecting said lens to any unsymmetrical internal strains.

Other collateral objects of the invention and practical solutions thereof are disclosed in the accompanying specification and illustrated in the drawings wherein:

Figs. 1–5 are vertical, longitudinal sections through various forms of our improved lens and lens mount.

Fig. 6 is a vertical, transverse section of the form of lens and lens mount shown in Fig. 5, taken on line 6—6 of Fig. 5.

Figs. 7–12 are vertical longitudinal sections through additional various forms of our improved lens and lens mount.

Similar letters of reference indicate like parts throughout the several figures of the drawings.

Referring to Fig. 1 the numeral 20 represents in a conventional manner, a cylindrical or tubular casing having an inwardly extending, annular flange 21 formed integrally at its front end, which, as seen in all of the drawings, is at the left end thereof. Adapted to be positioned against the rear edge of said flange 21 is a double convex lens 22, the outer diameter of which is somewhat smaller than the bore of said casing 20. The reason why the diameter of this lens is smaller than the bore of the casing is because in the present invention the periphery of the lens is not ground and is not relied upon to axially align the lens, this alignment being effected by mechanically shifting the lens laterally until it is in axial alignment. Hence, it is necessary to provide a sufficient clearance between the lens and the casing to permit of such a lateral movement.

Disposed against the rear face of aforesaid double convex lens 22 is a centering ring 23, the periphery of which is a hard push fit in the bore of the casing 20. When this centering ring 23 is pushed forcibly forward (to the left) the double convex lens 22 is caught between the front, inner edge of said ring and rear inner edge of the flange 21 of the casing 20. If at the commencement of this movement of the centering ring 23 it so happens (as it usually does in actual practice) that the lens 22 is axially out of line, the continued forward movement of said centering ring 23 will wedge over said lens in the one or other direction until all of the radially wedging forces imposed upon it are balanced. When this occurs the lens 22 is optically in line with the axis of the casing 20, inasmuch as its optical axis is necessarily coincident with those two radii of the two faces which lie in one common straight line. Hence, said lens 22 is optically aligned with the casing 20 entirely irrespective of the form or shape of its periphery, providing, of course, that the lens is not so eccentric as to permit its periphery to come into actual contact with the bore of the casing 20 or to permit the inner corners of the flange 21 or centering ring 23 to slide inside the periphery of the lens.

The outer rear edge of the centering ring 23 is annularly rabbeted to form a narrow annular centering ring 24. The latter bears against the front concave face of the concavo convex lens 25. Disposed rearwardly of the latter is a plano convex lens 26 and between the latter and the aforesaid concavo convex lens is arranged a centering ring 27. This latter ring is split diagonally at 28, the purpose of this split being to permit the ring to be made slightly over-size so as to have its periphery snugly in contact with the bore of the casing 20 and thereby be positioned accurately concentric with the axis of said casing 20, even though the manufacturing tolerances of both the ring and the casing are very large. It will be noted that when the concavo convex lens 25 and the plano convex lens 26 are pressed toward each other, the convex surface of the former imposes an outward thrust on the centering ring 27 and thereby presses the former in contact with the bore of the casing 20. This insures that the centering ring 27 will remain circular even though it is the natural tendency when distorted to assume a shape which is not circular but is more or less egg-shaped.

The reason why the other centering ring 23 is not split is because if it were split the concave surface of the concavo convex lens 25 would tend to push the centering ring 23 inwardly away from the bore of the casing 20 and thereby tend to render said centering ring unsymmetrical with respect to the axis of the casing 20.

It will be noted that the split 28 of the centering ring 27 is arranged obliquely with reference to the axis of said ring. The purpose of this oblique split is to prevent rays of light from passing longitudinally through the ring exteriorly of its bore.

Disposed against the rear convex face of the plano convex lens 26 is a clamping ring 30 whose periphery is threaded to engage with a suitable female thread 31 formed in the bore of the casing. When this clamping ring is tightened up, as for instance by engaging its slots 32 with a suitable spanner wrench, all three lenses, 22, 25 and 26 and both of the centering rings 23 and 27 are clamped between the flange 21 of the casing 20 and aforesaid clamping ring 30. The double convex lens 22 is caused to automatically center itself by reason of its being clamped between the casing flange 21 and the front inner edge of the front centering ring 23. The concavo convex lens 25 is similarly centered between the rear inner edge of the front centering ring 23 and the front inner edge of the rear centering ring 27. With reference to the plano convex lens 26, the rear centering ring 27 acts only as a spacing ring, all automatic centering being derived from the front inner edge of the threaded clamping ring 30.

Particularly when grinding the concave faces of lenses such as the concave face of the concavo convex lens 25, there is a very marked tendency to chip the peripheral edges of the lens unless the grinding pressure is very low and the abrasive very soft and fine. This causes an undue slowing down of the speed of the grinding operation. The present invention eliminates this difficulty by supplying the periphery of each of the lenses with a reinforcement 29 which is preferably sufficiently black and dull in color to absorb such grazing and outwardly directed oblique rays of light as occur when the lens and lens mounting is in actual service. This reinforcement 29 is, of course, applied to the periphery of the lenses prior to the grinding operation, and it may be applied in the form of black enamel in powder form, and the lenses then heated to melt the enamel, or it may be applied in molten form, preferably while the lenses are still hot. In the latter case, if these hot lenses are sent to the annealing lehr, the enamel will be baked simultaneously with the annealing of the lenses with no additional heat required for the enamel baking operation.

Fig. 2 illustrates how each of a plurality of lenses may be automatically centered with respect to a single reference point. In this construction the casing 33 is provided with an integral, inwardly projecting annular flange 34 at its front end which engages the front face of a double concave lens 35. Bearing against the rear face of this lens 35 is a spacing sleeve 36 whose rear face in turn bears against the front face of the plano convex lens 37. The rear face of the latter bears against and is centered by the centering ring 38 which is pressed forwardly toward the front end of the casing 33 by a clamping ring 39. It will be noted that the spacing sleeve 36 is out of contact with the bore of the casing 33 and that, therefore, it is centered by the rear face of the double concave lens 35 and acts only as a spacing member, the position of said front lens 35 being solely a function of the position of the casing flange 34, and the position of the rear lens 37 being solely a function of the centering ring 38.

In Fig. 3 is shown a construction suitable for optical systems in which the lenses are too close together to permit of a spacing ring. In this case the rear face of the front concavo convex lens 40 is in direct contact with the front face of the rear concavo convex lens 41. In this case the two lenses are caused to be axially aligned relative to each other by direct contact with each other and at the same time each lens is independently axially aligned by the flange 42 and the clamping ring 43 respectively.

In Fig. 4 is shown a construction in which the front lens 44 is axially aligned by solely one reference point; namely, the casing flange 45, while the rear lens 46 is located by the centering ring 47 and the clamping ring 48. This figure also illustrates how a number of lenses may be combined with a flat member such as the heat absorbing glass disc 49 which is not centered at all but does act as a spacing member in combination with the spacing sleeve 50.

It sometimes happens that the coefficient of friction between any two certain lenses is so great that they cannot be accurately centered when the construction of Fig. 3 is employed. In such an event a construction such as that shown in Figs. 5 and 6 may be adopted. In this case the front concavo convex lens 51 is not in direct contact with the rear concavo convex lens 52. Instead, the latter is enameled on its front face at 53 prior to the grinding of the lens and then, after the two faces of said lens have been ground, the lens is chucked up coaxially with the common optical axis of its two faces and the flat, enameled face 53 then trued up. Thereafter when the two lenses 51 and 52 are assembled in their casing 54, the front lens 51 makes contact with the enameled face 53 of the rear lens 52 and does not make contact with the lens 52 itself. It is to be understood, of course, that such an enamel should be chosen for the face 53 of lens 52 as will have a smaller coefficient of friction with the glass of the front lens 51 than the glass of the rear lens 52 would have with the glass of said front lens.

In the manner in which lenses are ordinarily mounted, the lenses are subjected to bending strains (in addition to their normal compression strains) unless the metal parts are machined within extremely fine limits. Figs. 5 and 6 illustrate one method of reducing such bending strains. In this construction the casing 54 is provided with an annular flange 55 at its one end and a threaded clamping ring 56 at its other end. This clamping ring 56 does not bear annularly against the front lens 51 but instead it is provided with an annular row of three equally spaced legs 57 whose rear ends bear against the front face of the front lens at three points and subjects said lens to substantially compression loads only.

Fig. 7 illustrates a pair of lenses 58 and 59 mounted in a casing 60. The front lens 58 is automatically centered between an integral flange 61 of the casing 60 and the front inner edge of a spacing ring 62. The rear lens 59 is automatically centered between the rear edge of the aforesaid spacing ring 62 and the front inner edge of a clamping ring 63. The latter is threaded at its rear end into the casing 60, but its front end at 64 is turned down somewhat and engages the smooth inner bore of the casing 60 and thereby acts as a pilot for centering clamping ring 63. This permits the screw threads of said clamping ring 63 and the threads of the casing 60 to be machined in a relatively coarse fashion and still causing the clamping ring 63 to be very accurately aligned with respect to the casing 60. This form of clamping ring has been found in actual practice to very accurately align any glass lens which has a reasonably small radius of curvature upon its one or other face.

Fig. 8 is similar to Fig. 7, except that the rear lens 65 is a double concave lens instead of a double convex lens as in Fig. 7. It has been found in actual practice of utmost importance that the lenses being automatically centered be clamped at points equi-distant from their optical axes. In this Fig. 7 is shown how each lens 66 and 65 is individually gripped by means which are equi-distant from its optical axis and that in addition to this both lenses are gripped by means which are equi-distant from their optical axes. Why this factor should be so important is not at present clearly understood, but that it is of great importance has been very definitely ascertained.

Fig. 9 shows a construction which is somewhat similar to that of Fig. 7 except that each lens 67 and 68 is individually gripped by the clamping rings 69 and 70 respectively. It will be noted that the notches 71 of clamping ring 70 (which are used for tightening said clamping ring) are omitted from the clamping ring 69 and replaced by a pair of longitudinally formed holes 72 for the reception of a suitable spanner wrench. This use of the holes 72 for tightening the front clamping ring 69 provides a smooth continuous edge of contact between said front clamping ring 69 and the rear lens 68. This construction of Fig. 9 has been found to align the two lenses 67 and 68 in the casing 73 much more accurately than with the less expensive construction shown in Fig. 7.

Fig. 10 shows a construction which is somewhat similar to that of Fig. 7 but shows how the casing 74 may be somewhat reduced in length by having the clamping ring 75 extending forwardly beyond the rear face of the rear lens 76. In this case the clamping ring 75 has its threads 77 formed at its front end and its pilot portion 78 formed at its rear end.

Fig. 11 illustrates a construction in which the cylindrical pilot portions 80 and 81 of the clamping rings 82 and 83 are disposed at the front end of said clamping rings and exteriorly thereof. This is effected by arranging the lenses 84 and 85 within the front ends of said clamping rings. This permits of having relatively long pilots so that the clamping rings are not only aligned laterally but are also prevented from cocking. With this arrangement all points of contact between each lens and its companion clamping ring lies in a transverse plane intersecting points of contact between its pilot portion 80 or 81 and the aligning bore 86 or 87 of the casing 88.

In this construction is also shown a modified means of screwing the front clamping ring into place. This consists of a pair of spanner slots 90 which are milled diametrically in the front clamping ring 82 but stop short of the annular aligning corner 91 of said front clamping screw. This prevents any burrs at the corners of said slots 90 from interfering with the proper alignment of the rear lens 85.

Fig. 12 illustrates a construction in which the clamping sleeve 92 is unprovided with a pilot but instead is caused to be coaxial with the bore of the casing 93 by reason of the relatively long and very accurately machined threads 94. This construction also shows how two lenses, such as the lenses 95 and 96, may be pressed substantially in face to face contact and yet be free to move laterally with respect to each other without undue friction. This is effected by placing a metal ring 97 on the front peripheral edge of the rear lens 96, the inner portion of said metal ring 97 being flared inwardly and rearwardly so that when the two lenses 95 and 96 are placed together with this ring 97 between them, said ring is prevented from being laterally displaced by reason of its flared shape.

It is to be understood that this invention is not to be confined to the particular forms herein illustrated and described, but is to include all lenses and/or lens mounts encompassed by the following claims.

We claim:

1. A casing for a lens mount having a cylindrical bore; a centering means carried in said bore and formed of a ring axially movable in said bore and having a lens-bearing, circular, contacting edge disposed perpendicularly of the axis of the casing and spaced from said casing; a lens in said casing; retaining means in said casing to hold said ring and lens in substantial contact around the bearing edge of said ring, whereby said lens is optically centered with its axis parallel to the axis of the bore of said casing.

2. A casing for a lens mount having a cylindrical bore; a centering means carried in said bore and formed of a ring axially movable in said bore and having a lens-bearing, circular, contacting edge disposed concentric to the axis of the casing; said ring having a cut back portion adjacent its lens contacting edge; a lens in said casing; retaining means in said casing to hold said ring and lens in substantial contact around the bearing edge of said ring whereby said lens is optically centered with its axis coincident with the axis of the bore of said casing.

3. A casing for a lens mount having a cylindrical bore; a centering means carried in said bore and formed of a ring axially movable in said bore and having a lens-bearing, circular, contacting edge disposed perpendicularly of the axis of the casing; said ring having a cut back portion adjacent its lens contacting edge; a lens having a concave face arranged in said casing; retaining means in said casing to hold said ring and lens in substantial contact around the bearing edge of said ring, whereby said lens is optically centered with its axis parallel to the axis of the bore of said casing.

4. A casing for a lens mount having a cylindrical bore; a centering means carried in said bore and formed of a ring axially movable in said bore and having a lens-bearing, circular, contacting edge disposed perpendicularly of the axis of the casing; said ring having a cut back portion surrounding its lens contacting edge; a double convex lens in said casing; retaining means in said casing to hold said ring and lens in substantial contact around the bearing edge of said ring, whereby said lens is optically centered with its axis parallel to the axis of the bore of said casing.

5. A lens and lens mount comprising: a tubular casing; a lens having a curvilinear face and having a diameter appreciably smaller than the bore of said casing; means connected with said casing and arranged to restrain longitudinal movement of said lens; a split centering ring arranged within the bore of said casing and only bearing against the curvilinear face of said lens inwardly of its peripheral edge; and means connected with said casing and arranged to press the centering ring toward the lens.

6. A lens and lens mount comprising: a tubular casing; a lens having a curvilinear face and having a diameter appreciably smaller than the bore of said casing; means connected with said casing and arranged to restrain longitudinal movement of said lens relatively to said casing; an obliquely split centering ring arranged within the bore of said casing and only bearing against the curvilinear face of said lens inwardly of its peripheral edge; and means connected with said casing and arranged to press the centering ring toward the lens.

7. A lens and lens mount comprising: a tubular casing; a lens having a curvilinear face and having a diameter appreciably smaller than the bore of said casing; means connected with said casing and arranged to restrain longitudinal movement of said lens; a compressed, split, centering ring arranged within the bore of the said casing and only bearing against the curvilinear face of said lens inwardly of its peripheral edge, the expanded diameter of such centering ring being larger than the bore of said casing; and means connected with said casing and arranged to press the centering ring toward the lens.

8. A lens and lens mount comprising: a tubular casing; a lens having a diameter appreciably smaller than the bore of said casing; means connected with said casing and arranged to restrain longitudinal movement of said lens relative thereto; a second lens having a curvilinear face and also having a diameter appreciably smaller than the bore of said casing; an anti-friction ring arranged between said lenses; and centering means connected with said casing and only bearing against the curvilinear face of the second named lens inwardly of its peripheral edge.

FRANK A. BANGERT.
RALPH K. DAY.
THOMAS G. AITCHESON.
LAWRENCE J. DAVENPORT.